United States Patent
Shkolnikov et al.

(10) Patent No.: US 11,946,902 B2
(45) Date of Patent: Apr. 2, 2024

(54) DIELECTROPHORESIS SEPARATOR CROSS-OVER FREQUENCY MEASUREMENT SYSTEMS

(71) Applicant: Hewlett-Packard Development Company, L.P., Spring, TX (US)

(72) Inventors: Viktor Shkolnikov, Palo Alto, CA (US); Yang Lei, Palo Alto, CA (US); Daixi Xin, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/056,488

(22) PCT Filed: Oct. 11, 2018

(86) PCT No.: PCT/US2018/055425
§ 371 (c)(1),
(2) Date: Nov. 18, 2020

(87) PCT Pub. No.: WO2020/076327
PCT Pub. Date: Apr. 16, 2020

(65) Prior Publication Data
US 2021/0223203 A1    Jul. 22, 2021

(51) Int. Cl.
*G01N 27/447*  (2006.01)
*B03C 5/00*    (2006.01)
*B03C 5/02*    (2006.01)

(52) U.S. Cl.
CPC ....... *G01N 27/44713* (2013.01); *B03C 5/005* (2013.01); *B03C 5/026* (2013.01); *B03C 2201/26* (2013.01)

(58) Field of Classification Search
CPC ...... B03C 5/005; B03C 5/026; B03C 2201/26
See application file for complete search history.

(56) References Cited

U.S. PATENT DOCUMENTS 10,766,040 B2 *  9/2020  Wakizaka ............... B03C 5/026
2007/0095669 A1  5/2007  Lau et al.
(Continued)

FOREIGN PATENT DOCUMENTS

| SU | 744285 | 6/1980 |
| WO | WO-2013096304 | 6/2013 |
| WO | WO-2015022481 A1 | 2/2015 |

OTHER PUBLICATIONS

M Koch, Design and fabrication of a micromachined Coulter counter, J. Micromech. Microeng. 1999(9), p. 159-61. (Year: 1999).*
(Continued)

*Primary Examiner* — Caitlyn Mingyun Sun
(74) *Attorney, Agent, or Firm* — Foley & Lardner LLP

(57) ABSTRACT

In example implementations, an apparatus is provided. The apparatus includes a dielectrophoresis (DEP) separator, an electrical field generator, a tracking system, and a controller. The DEP separator is to separate a plurality of different particles. The electrical field generator is coupled to the DEP separator to apply a frequency to the DEP separator. The tracking system is to track a movement of a type of particles in the DEP separator. The controller is in communication with the electrical field generator to control the frequency and the tracking system to track the separation. The controller is to calculate a cross-over frequency from a cross-over frequency distribution for the type of particles based on a frequency sweep performed on the type of particles and the movement of the type of particles that is tracked.

12 Claims, 7 Drawing Sheets

(56) References Cited

U.S. PATENT DOCUMENTS

| | | | |
|---|---|---|---|
| 2011/0312598 A1* | 12/2011 | Azimi | B01L 3/502738 |
| | | | 435/287.2 |
| 2015/0360236 A1 | 12/2015 | Garcia et al. | |
| 2017/0028408 A1* | 2/2017 | Menachery | G01N 33/48707 |
| 2017/0218424 A1 | 8/2017 | Swami et al. | |
| 2018/0231555 A1 | 8/2018 | Davis | |

OTHER PUBLICATIONS

Broche, Lionel Marc. Automated dielectrophoresis with microwell chips. University of Surrey (United Kingdom), 2009.

\* cited by examiner

DIELECTROPHORESIS SEPARATOR CROSS-OVER FREQUENCY MEASUREMENT SYSTEMS

BACKGROUND

Various different industries use different devices to perform particle separation. In the medical industry, separation devices can be used to separate cells or other particles in solution for various different applications. For example, separation devices can be used to extract rare particles out of a mixture of common particles (e.g., where a ratio of common to rare is <1:1000). One example of such a separation may be to separate tumor cells from other cells in the blood of a patient. The separated tumor cells can then be used for disease diagnosis or otherwise analyzed.

DETAILED DESCRIPTION

Examples described herein provide an apparatus and method to automatically measure cross-over frequencies of various types of particles or cells in DEP separators. As discussed above, separation of particles in the medical industry can have important applications, such as separating out tumor cells in a patient's blood. Different types of particles or cells can behave differently within an electric field of the DEP separators disclosed herein. Some designs may use an array of planar electrodes to attract certain cells using dielectrophoresis. However, the design of the array of planar electrodes can become less effective due to the ability of particles to touch the planar electrodes. As a result, other attractive forces (e.g., Van der Waals forces), in addition to the electrical fields, can cause a particle to be attracted to the planar electrodes.

In addition, the attractive forces of the array of planar electrodes decay exponentially based on a distance from the electrodes. As a result, if a particle is further away from the array of planar electrodes, the particle may not experience the attractive forces of the electrical fields generated by the array of planar electrodes.

The present disclosure provides an apparatus that controls a location of the particles in the fluid as the fluid flows through a DEP separator. The electrodes of the DEP separator are not planar, but rather located along the walls of the microfluidic channel that runs through the DEP separator. As a result, a uniform electrical field can be generated that can improve separation of the particles in the fluid.

In one example, the voltage or current that is applied to the electrodes in the DEP separator may be a function of the type of particles that are in the fluid. For example, different cells may have different dielectrophoretic properties, e.g., cross-over frequencies. Thus, setting the DEP separator with the correct operating frequency according to the cross-over frequencies of the particles to be separated may improve the performance of the DEP separator.

Examples herein provide an apparatus that can automatically measure cross-over frequencies for the particle or cell traveling in the improved DEP separators of the present disclosure. The cross-over frequencies can be stored in memory, and a controller may automatically set a frequency of an electric field generator in the DEP separator according to the cross-over frequency associated with types of cells and a buffer solution used in the DEP separator.

The apparatus can use a tracking system to track the separation of the particles in the DEP separator during the measurement process as the controller sweeps the frequencies of the electric field generator. The tracking system may be a video based or a non-video based system. The optimal cross-over frequency for each type of particle or cell and buffer solution may be determined based on data collected from the tracking system.

Figure 1:
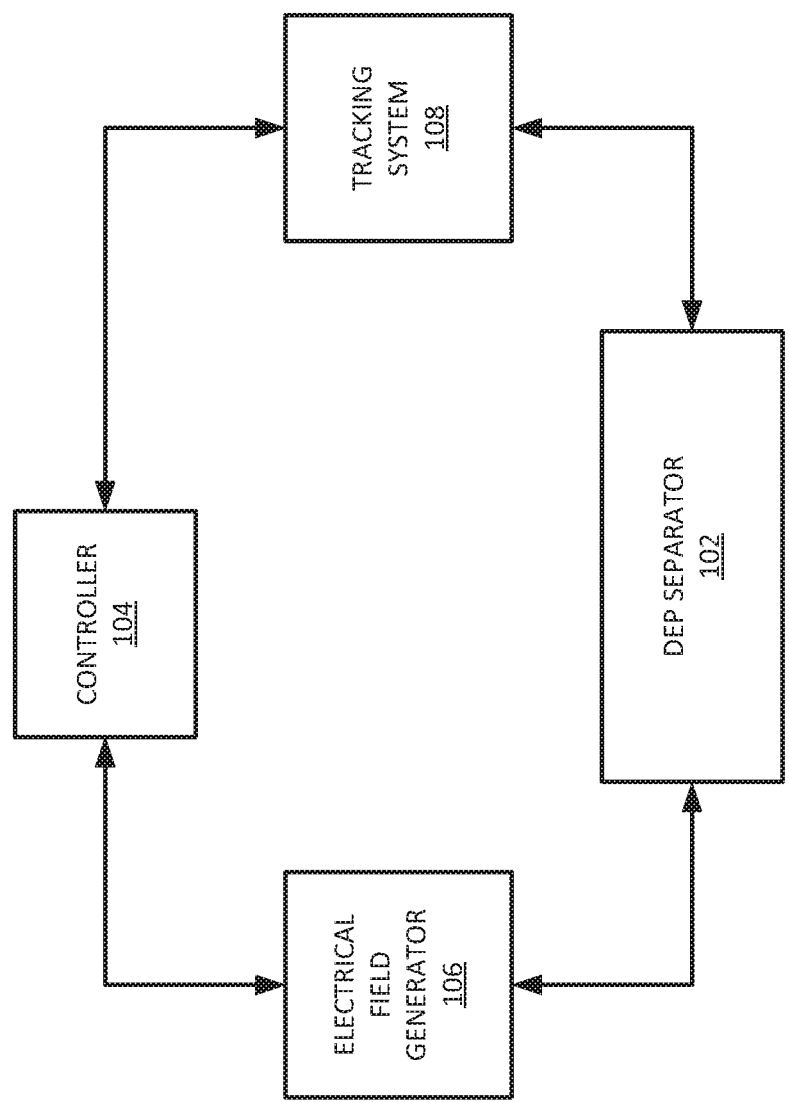
FIG. 1 is a block diagram of an example apparatus that automatically measures cross-over frequencies in a dielectrophoresis (DEP) separator.

FIG. 1 illustrates an example an apparatus 100. In one example, the apparatus 100 may include a DEP separator 102, a controller 104, an electrical field generator 106, and a tracking system 108. In one example, the controller 104 may be communicatively coupled to the electrical field generator 106 and the tracking system 108.

The electrical field generator 106 may include an electrical field wave generator. The wave generator may be a power supply, a voltage source, a current generator, and the like. In one example, the electrical field generator 106 may generate an oscillating charge or current between electrodes of the DEP separator 102. The oscillating charge may be applied at a controlled frequency.

In one example, the controller 104 may be a processor or central processing unit (CPU). The controller 104 may control a frequency of the oscillating charge generated by the electrical field generator 106. The controller 104 may control the electrical field generator 106 to apply different frequency steps within a frequency range to calculate a cross-over frequency for a particular type of cell separation in the DEP separator 102. For example, the frequency steps may be 10 kilohertz (kHz) steps within a range of 20-300 kHz.

In one example, the tracking system 108 may collect information associated with particles moving in the DEP separator 102 due to the electrical field generated by the electrical field generator 106. The information may be collected for each frequency step that is applied to the DEP separator 102.

The information may be processed by the controller 104 to determine a cross-over frequency of a particular type of cell or particle that is injected into the DEP separator 102. When the same type of cell is injected into the DEP separator 102 at a later time, the controller 104 may automatically determine the cross-over frequency for that type of cell and set the electrical field generator 106 according to its cross-over frequency.

For example, the controller 104 may analyze the information collected by the tracking system 108 to determine at which frequency a particular cell or particle in the DEP separator 102 begins to move to a different outlet channel. The frequency that causes the cell in the DEP separator 102 to separate out into the different outlet channel may be determined to be the cross-over frequency.

In one example, each type of cell may have a particular frequency that causes the cell to move a different outlet channel in the DEP separator 102. This frequency may be referred to as the cross-over frequency. In one example, a distribution curve may be generated for a fraction of the cells that move from one outlet channel to the different outlet channel versus the frequencies that are applied during the frequency sweeps described above. A peak of a derivative of the distribution curve may be identified as the cross-over frequency for that particular cell.

Subsequently, a mixture of cells may be injected into the DEP separator 102. The cells may be selected such that the distribution curves do not significantly overlap. For example, less than half of a distribution curve of a first cell may overlap with a distribution curve of a second cell in the mixture. The DEP separator 102 may be set to operate at a frequency that is between the peaks of the distribution curves.

Figure 5:
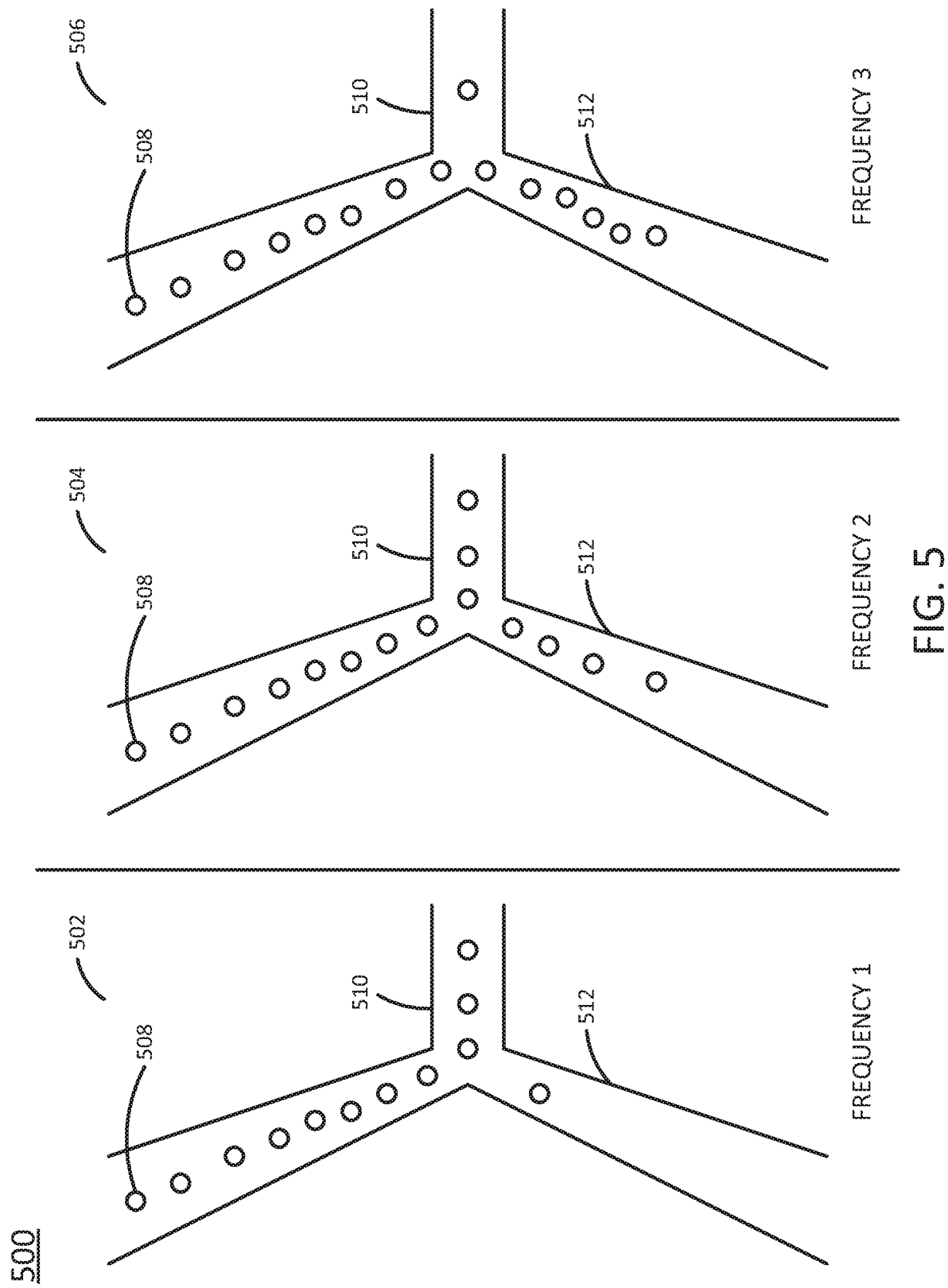
FIG. 5 is a schematic diagram of a separation of particles in the DEP separator.

FIG. 5 illustrates a schematic diagram 500 of how data for a distribution curve used to identify the cross-over frequency of a particular cell or particle is collected by tracking movement of the cell in the DEP separator 102. In a first example 502, the microfluidic channels may include a plurality of cells 508 of a particular type that enters a separation region that applies a first frequency. However, at the first frequency, the cells 508 may mostly exit through a first outlet channel 510. Thus, at the first frequency the cell fraction may be 0.10.

As the controller 104 sweeps the frequencies, a second frequency may be applied to the separation region of the DEP separator 102. At the second frequency, some of the cells 508 may begin to move to the first outlet channel 510 and a second outlet channel 512. Thus, at the second frequency the cell fraction may be approximately 0.5

The controller 104 may continue to increase the frequency to sweep all frequencies within a frequency range. At a third frequency, the cells 508 may mostly exit through the second outlet channel 512. Thus, at the third frequency the cell fraction may be approximately 0.90.

By collecting the cell fraction versus the frequency, a first distribution curve of the cell fraction that moves into the first outlet channel 510 versus frequency may be generated and a second distribution curve of the cell fraction that moves into the second outlet channel 512 versus frequency may be generated. A derivative of the distribution curves may be calculated to obtain a distribution of cross-over frequencies. A peak of the derivative distribution curve may be associated with the cross-over frequency.

Figure 2:
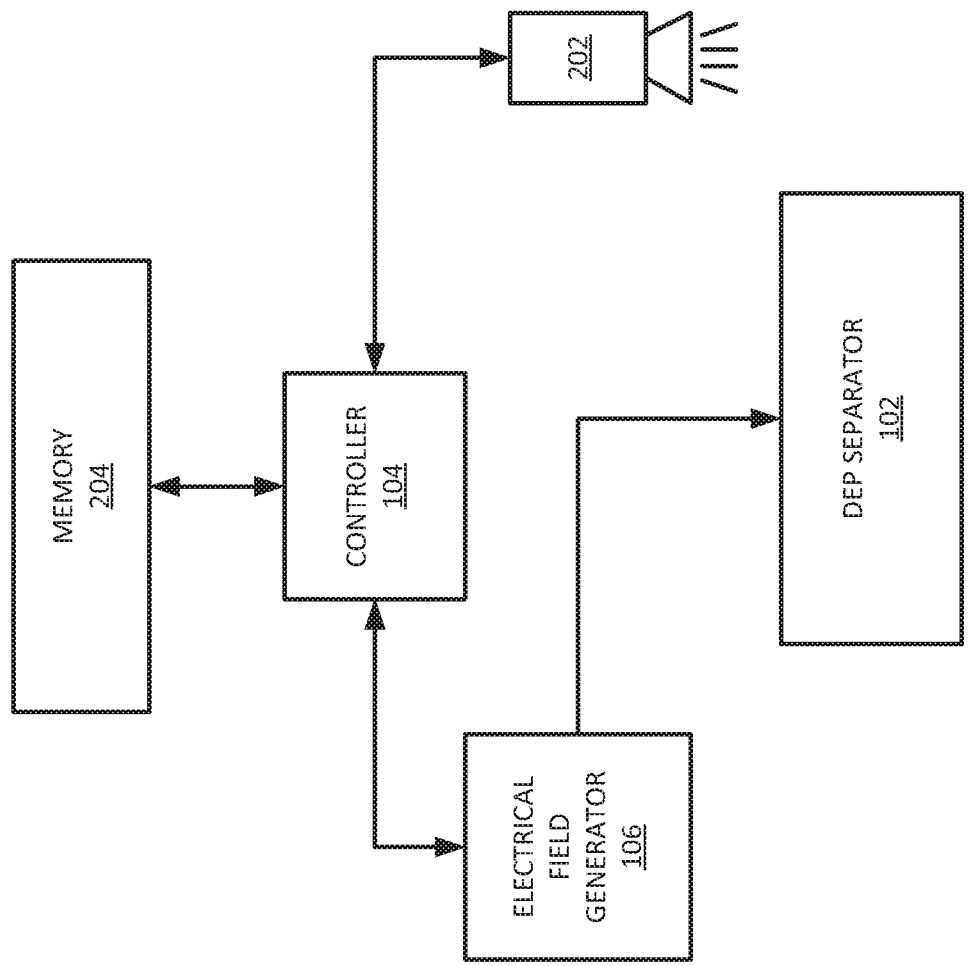
FIG. 2 is a block diagram of an example apparatus with a video camera.

FIG. 2 illustrates a block diagram of an example apparatus 200. In one example, the apparatus 200 may have the DEP separator 102, the controller 104, and the electrical field generator 106, as described in FIG. 1. However, the tracking apparatus 108 illustrated in FIG. 1, may be a video camera 202 as illustrated in FIG. 2.

The video camera 202 may be any type of video camera that can capture video images. The video images may be a series of video frames captured by the video camera 202. The video camera 202 may be a red, green, blue (RGB) camera, an infrared camera, a depth sensing camera, and the like.

In one example, the video camera 202 may capture video of a separation region of the DEP separator 102. The frames of the video that are captured may be transmitted to the controller 104 and analyzed by the controller using any type of video image analysis program. Based on analysis of each frame of video, the controller 104 may track the movement of each cell through the separation region of the DEP separator 102. The frames of each video may be tagged with an associated frequency that was applied to create the electrical field. As a result, the controller 104 may analyze the frames of video to track movement of the fraction of cells between outlet channels, as illustrated in FIG. 5 and described above. The tracked movement of the fraction of cells during the frequency sweeps may be used to calculate the cell fraction data versus frequency. The controller 104 may then generate the distribution curves to calculate the cross-over frequency for a particular type of cell, as discussed above.

In one example, the controller 104 may analyze each frame of video captured by the video camera 202. For each frame of video, the controller 104 may detect individual moving cells. For example, a background may be estimated or detected in each frame. The background may then be subtracted from the image. In one example, noise and out of focus cells may also be removed from each frame.

The remaining pixels may represent different cells within the frame of video. Each cell may be identified for tracking. Each new cell that appears in subsequent frames may also be identified for tracking, as described above.

A video tracking function may be applied to each frame of video that has been pre-processed to track the movement of each cell through the frames of video. Any tracking algorithm may be used such as, for example, Kalman filtering, Medianflow tracker, Kernelized Correlation filters, and the like. When a cell that is being tracked exits a region of interest (e.g., a field of view of the video camera 202) the tracking algorithm may be stopped for the cell.

When the cross-over frequency for the cell is calculated, the controller 104 may store the cross-over frequency in a memory 204. The controller 104 may be communicatively coupled to the memory 204 and may store and retrieve data from the memory 204. For example, the cross-over frequencies that are calculated for different types of cells may be stored in a table in the memory 204.

The memory 204 may be any type of non-transitory computer readable memory, such as a hard disk drive, a random access memory, an external storage drive, and the like. The memory 204 and the controller 104 may be combined as part of a single computing system or separated as part of a computing device/network storage system.

Figure 3:
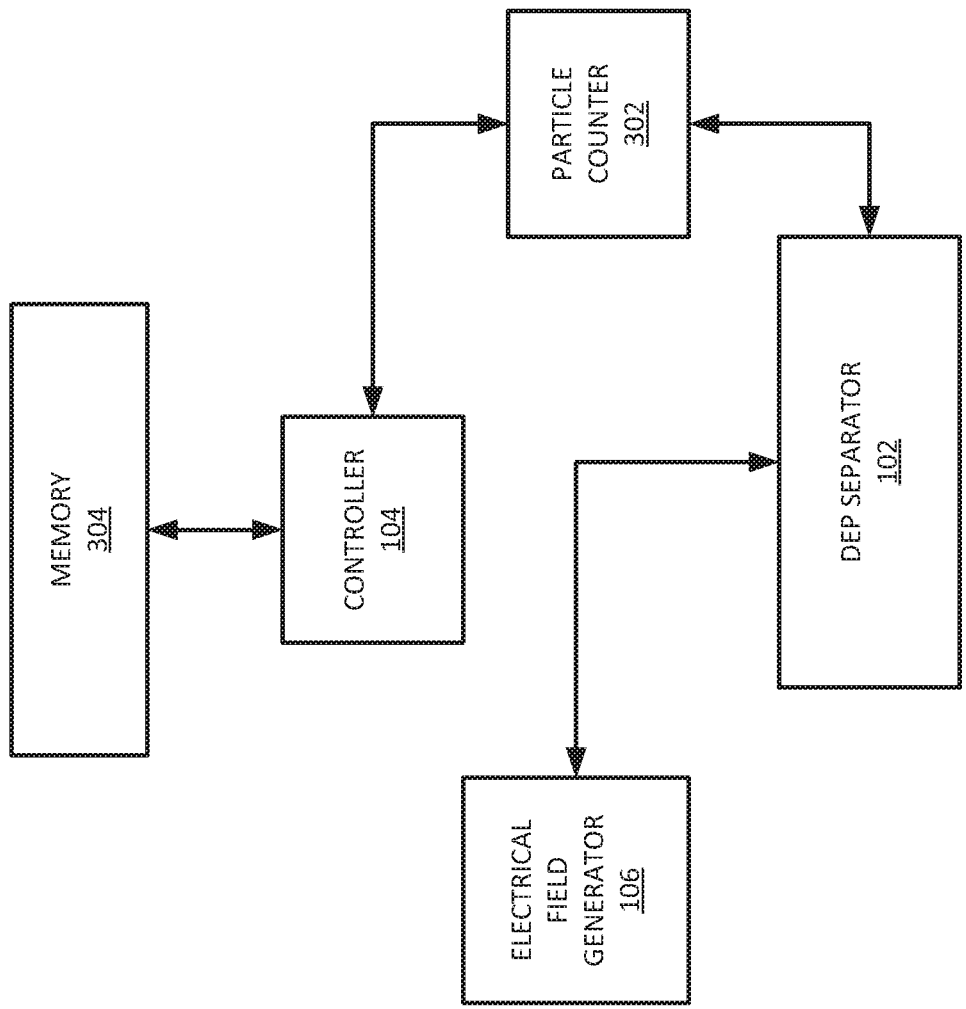
FIG. 3 is a block diagram of an example apparatus with a particle counter.

FIG. 3 illustrates a block diagram of an example apparatus 300. The apparatus 300 may include the DEP separator 102, the controller 104, and the electrical field generator 106, as described in FIG. 1. However, the tracking apparatus 108 illustrated in FIG. 1, may be a particle counter 302 as illustrated in FIG. 3.

In one example, the particle counter 302 may be a coulter counter. The controller 104 may be communicatively coupled to each coulter counter in each outlet channel of the DEP separator 102. The controller 104 may track a type and number of cells that cross each coulter counter. The type of cell may be determined based on a duration of a cell that passes across sensors of the coulter counter. For example, a large duration between the sensors may mean a large cell and a short duration between the sensors may mean a smaller cell.

Based on analysis of the particle counter 302, the controller 104 may collect cell fraction versus frequency data to generate the distribution curves described above. The controller 104 may then calculate the cross-over frequency for a particular type of cell based on the distribution curves. The cross-over frequency may be defined as above and illustrated in FIG. 5. In one example, the cross-over frequency may be stored in a memory 304. The memory 304 may be communicatively coupled to the controller 104. The memory 304 may be similar to the memory 204 illustrated in FIG. 2 and described above.

Figure 4:
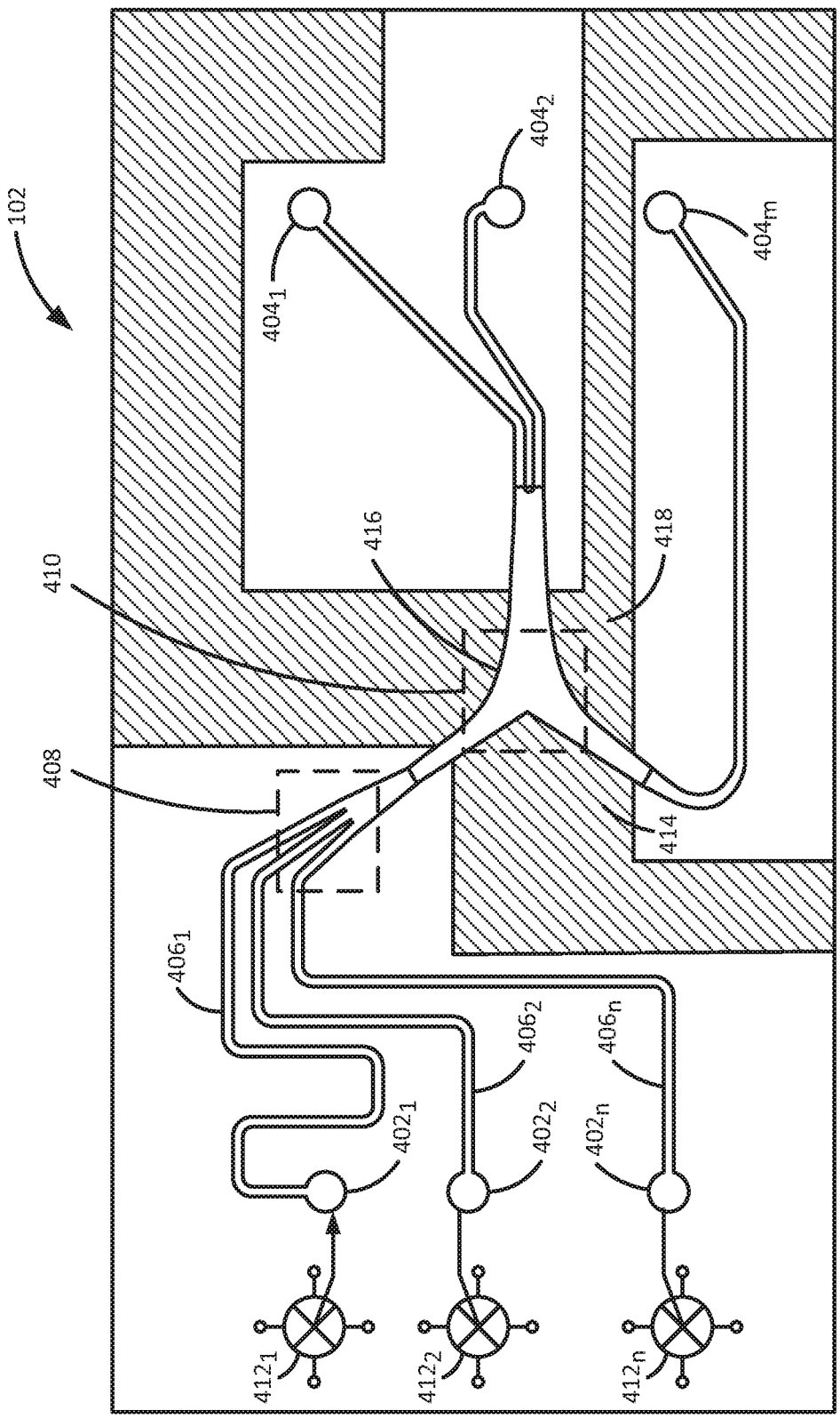
FIG. 4 is a top view of an example of a DEP separator of the present disclosure.

FIG. 4 illustrates a top view of an example of the DEP separator 102 of the present disclosure. In one example, the DEP separator 102 may include sample inlets $402_1$-$402_n$ (hereinafter also referred to individually as an inlet 402 or collectively as inlets 402). Each inlet 402 may be coupled to a microfluidic channel $406_1$-$406_n$ (hereinafter also referred to individually as a microfluidic channel 406 or collectively as microfluidic channels 406). In one example, a sheath fluid or buffer that carries different cells may help the particles to generally line up while passing through a separator region 410. The buffer may provide for a relatively easier separation of the cells in the separator region 410.

In one example, each inlet 402 may be coupled to a respective proportioning valve $412_1$-$412_n$ (hereinafter also referred to individually as a proportioning valve 412 or collectively as proportioning valves 412). The proportioning valves 412 may allow the buffer composition or sheath fluid to be changed. Thus, the cross-over frequency can be calculated as a function of the cell and a buffer composition.

In one example, the buffer solution may be a solution that is compatible with the separations performed by the DEP separator 102. For example, the buffer solution may have a low conductivity pH 7 buffer that is made to be isotonic to the cells via sucrose. For example, the buffer may be a solution of about 9.5% sucrose, about 0.1 milligram per milliliter (mg/mL) dextrose, about 0.1% pluronic F68, about 0.1% bovine serum albumin, about 1 millimolar (mM) phosphate buffer pH 7 (adjustable), about 0.1 mM CaAcetate, about 0.5 mM MgAcetate, and about 100 units/ml catalase.

In one example, the flow rate of the fluid may be greater than the flow rate of the cells. For example, the fluid may flow at about 0.2 mL/minute (min). In other examples, the flow rate may be increased to about 20 mL/min or decreased to about 0.001 mL/min.

The cells may be any type of cell. The cells may include cells that are of interest and not of interest. The DEP separator 102 may be used to separate the cells of interest from the remaining types of cells in the fluid. The cells may include red blood cells, white blood cells, platelets, cancer cells, bacteria, yeast, microorganisms, or any other type of biological micro-particles such as proteins. The fluid may include two or more different types of particles that are to be separated out.

In an example, the microfluidic channels 406 may merge into a single channel that flows through a focusing region 408. The focusing region 408 may be a region that is shaped to control a location of the particles in the fluid before the particles enter the separation region 410. For example, the focusing region 408 may be a tapered section in the microfluidic channels 406 to narrow the cross-section of the channel in which the fluid flows.

In one example, the focusing region 408 may be a dual axis focuser. In other words, the focusing region 408 may control the location along a vertical axis and a horizontal axis. For example, the focusing region 408 may taper the portion of the channel in both the vertical direction and the horizontal direction. In one example, the focusing region 408 may focus the cells in a center of the channel.

In one example, the focusing region 408 may focus the particles in the fluid as they move towards the separation region 410. The separation region 410 may implement an electrical field on the cells in order to force the cells to be separated from each other and pass into different outlet channels $404_1$-$404_m$ (hereinafter also referred to individually as a channel 404 or collectively as channels 404). In order for the electrical field to affect the plurality of cells, the cells do not have to be charged. Instead, because cells exhibit dielectrophoretic activity in the presence of the electric field, the different cells may react differently in the presence of the electrical field and are, thereby, separated as they travel through the separation region 410.

In one example, the separation region 410 may include a first electrode 416, a second electrode 418 and a ground electrode 414. The electrical field generator 106, described above, may apply a current or voltage through the first electrode 416 and the second electrode 418 to create an electrical field. In one example, the electrical field generator 106 may be communicatively coupled to the first electrode 416 and the second electrode 418. The amount of voltage or current that is passed may depend on the type of cells that are injected into the inlet channels 402. The separation region 410 may separate the cells along a horizontal plane (e.g., left (towards a top of the page) and right (towards a bottom of the page)).

In one example, some of the cells that are not part of the diagnostic process may be separated out by the separation region 410 into the outlet channel $404_m$. In one example, the outlet channel $404_m$ may be a waste outlet channel. The remaining particles may continue towards the outlet channels $404_1$ and $404_2$.

Figure 6:
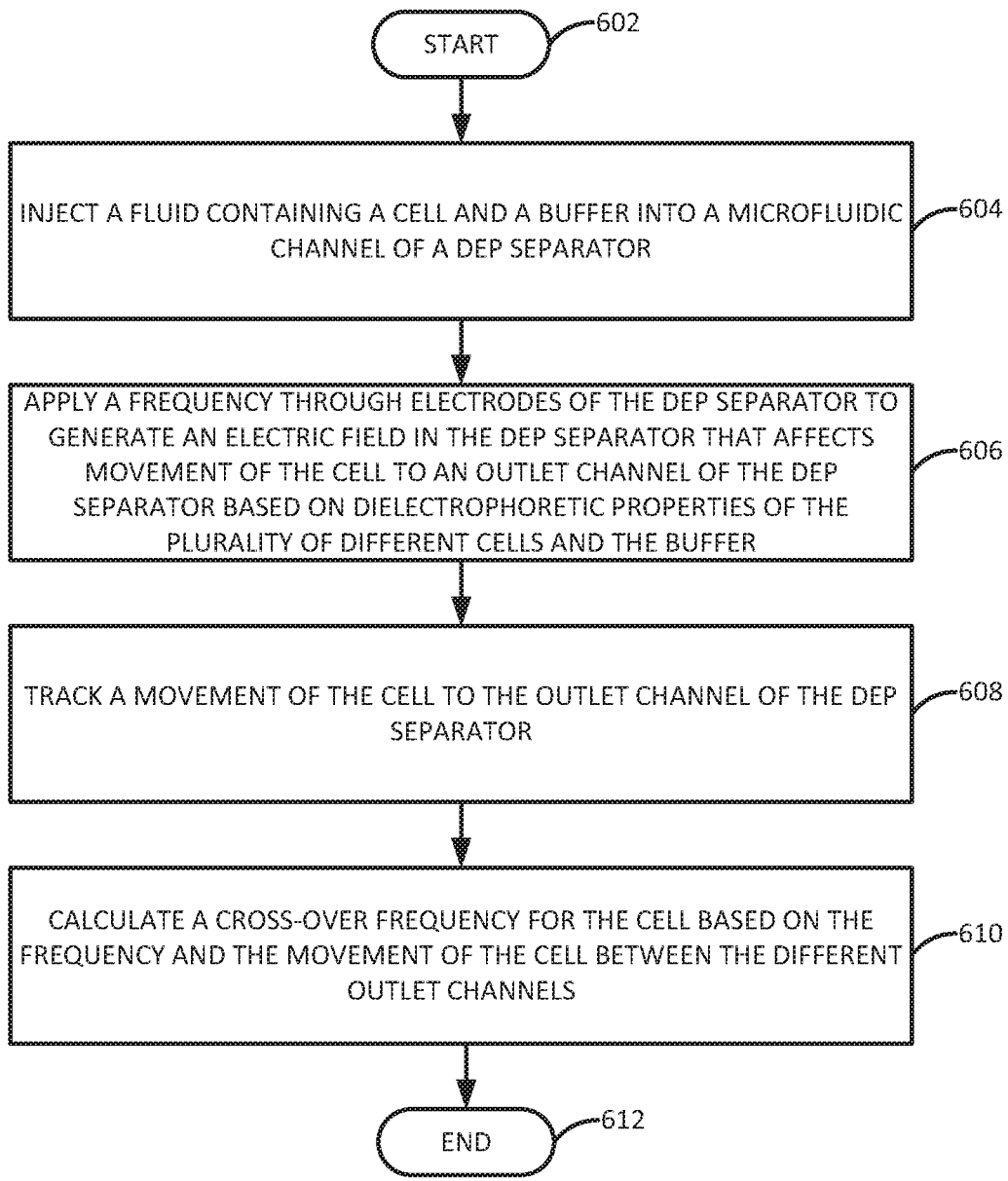
FIG. 6 is a flow chart of an example method for measuring cross-over frequencies in a DEP separator.

FIG. 6 illustrates a flow diagram of an example method 600 for separating particles. In an example, the method 600 may be performed by the apparatus 100, 200, or 300 described above.

At block 602, the method 600 begins. At block 604, the method 600 injects a fluid containing a cell and a buffer into a microfluidic channel of a dielectrophoresis (DEP) separator. The cell may be an organic particle or a type of cell. The fluid may contain many cells of a particular type of cell. The DEP separator may be used to calculate a cross-over frequency of the cell and used to separate the cell from a mixture that includes the cell based on the cross-over frequency that is calculated.

In one example, the method 600 may be repeated with different fluids and different types of cells. The fluid may be a buffer solution that can be changed for each run. For example, a proportioning valve may be used at the inlet channel to create different types of buffer solutions such that the cross-over frequency versus buffer solution can be calculated for different types of cells.

At block 606, the method 600 applies a frequency through electrodes of the DEP separator to generate an electric field in the DEP separator that affects movement of the cell to an outlet channel of the DEP separator based on dielectrophoretic properties of the plurality of different cells and the buffer. In one example, the block 606 may be repeated for a plurality of different frequencies. For example, the frequency may be incrementally increased by a plurality of different predefined frequency steps over a pre-defined range of frequencies. For example, a particular frequency may cause a cell flowing out of one outlet channel to flow out of a different outlet channel of the DEP separator.

At block 608, the method 600 tracks a movement of the cell to the outlet channel of the DEP separator. For example, a fraction of the cells that flow out of a particular outlet channel of the DEP separator at a particular frequency may be tracked. The cell fraction data may be used to calculate a cross-over frequency. In one example, the block 608 may be repeated for each frequency step that is applied.

In one example, the tracking may be performed via a video image analysis or a particle counter. For example, a video camera may capture video images at a separation region of the DEP separator. The video images captured by the video camera can be analyzed, as discussed above, to track movement of cells and count the number of cells that travel to the different outlet channels.

In another example, each outlet channel may have a particle tracking device. The particle tracking device may be a coulter counter. The coulter counter can detect a type of cell and a number of cells based on the size of the particle that crosses through the coulter counter.

At block 610, the method 600 calculates a cross-over frequency for the cell based on the frequency and the movement of the cell to the outlet channel. For example, based on the tracking and counting of the cells that travel to, or flow out of, each outlet channel, initial distribution curves of cell fractions of movement to each outlet versus the frequency may be generated. A derivative of the initial distribution curves for each outlet channel may be calculated. The derivative distribution curve may provide a distribution of cross-over frequencies. A peak of the derivative distribution curve may be calculated to be the cross-over frequency for a particular type of cell. The cross-over frequency may be the frequency that causes the particles to separate into respective outlet channels.

In one example, the initial distribution curve of cell fractions of movement to each outlet versus the frequency may be fitted with a predefined distribution. For example, the predefined distribution may be an error function, such as the Gauss error function. The derivative of the fitted distribution/function may then be taken rather than the raw data to suppress noise in the result. The cross-over frequency may then be determined based on the derivative distribution of the fitted distribution/function.

In one example, the cross-over frequency may be calculated for a plurality of different types of cells and different types of buffer solutions. The cross-over frequencies may be stored in a memory. Based on a type of cell that is injected into the DEP separator, the controller may find the cross-over frequency for the type of cell that is injected and automatically set the electrical field generator to an operational frequency based on the cross-over frequency of each of the cells in the mixture. For example, the operational frequency may be a frequency that is between the derivative distribution curves of cross-over frequencies for each type of cell that is in the mixture. As result, the DEP separator may quickly and automatically set the operational frequency for the electrical field generator based on the cross-over frequency to effectively separate any type of cell that is injected into the DEP separator. At block 612, the method 600 ends.

Figure 7:
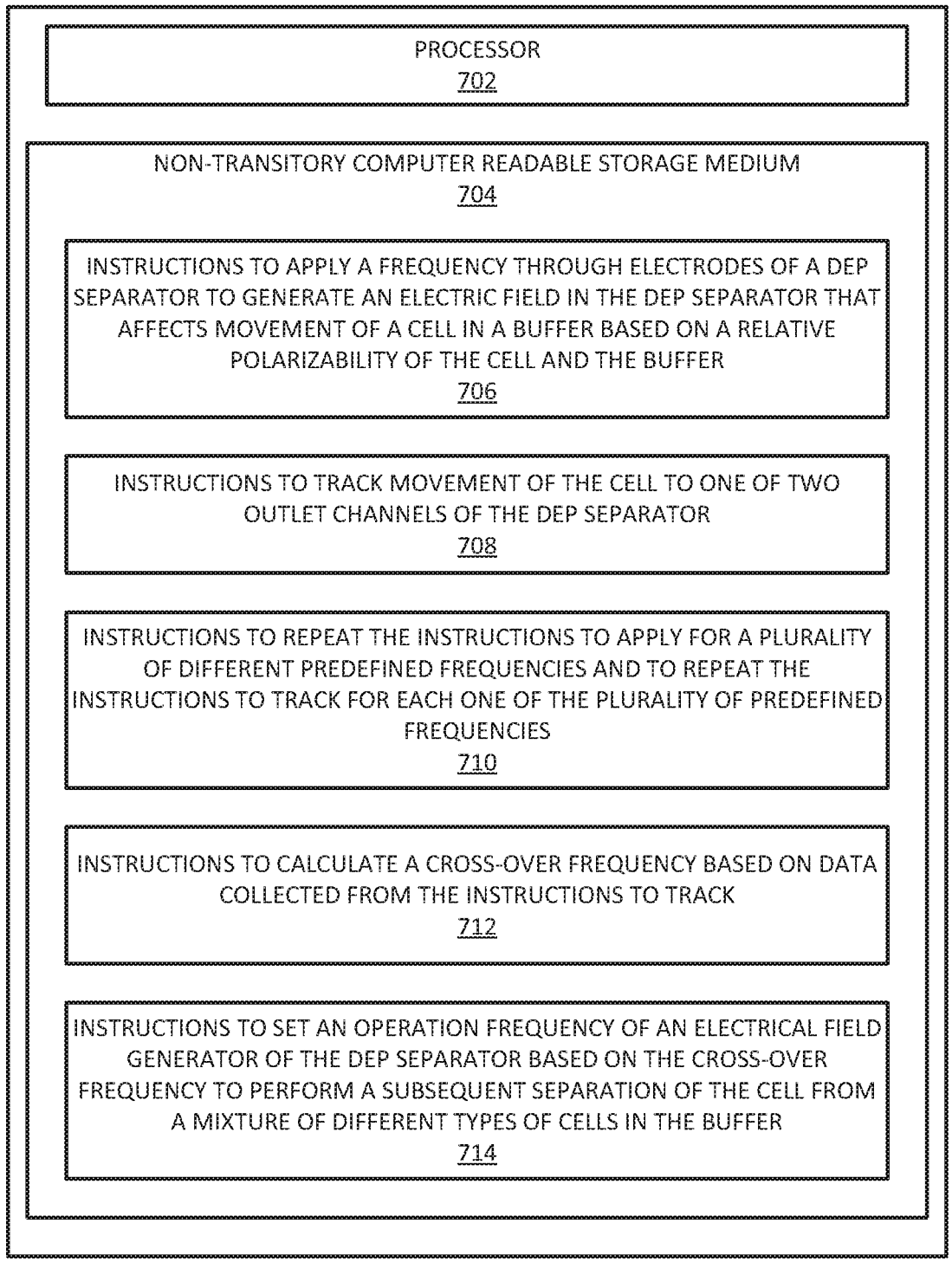
FIG. 7 is a block diagram of an example non-transitory computer readable storage medium storing instructions executed by a processor to measure cross-over frequencies in a DEP separator.

FIG. 7 illustrates an example of an apparatus 700. In an example, the apparatus 700 may be the apparatus 100, 200, or 300. In an example, the apparatus 700 may include a processor 702 and a non-transitory computer readable storage medium 704. The non-transitory computer readable storage medium 704 may include instructions 706, 708, 710, 712, and 714 that, when executed by the processor 702, cause the processor 702 to perform various functions.

In an example, the instructions 706 may include instructions to apply a frequency through electrodes of a DEP separator to generate an electric field in the DEP separator that affects movement of a cell in a buffer based on a relative polarizability of the cell and the buffer. In one example, the relative polarizability may be a polarizability of a cell or particle relative to that of a surrounding media (e.g., the buffer or other types of cells or particles).

The instructions 708 may include instructions to track movement of the cell to one of two outlet channels of the DEP separator. The instructions 710 may include instructions to repeat the instructions to apply for a plurality of different predefined frequencies and to repeat the instructions to track for each one of the plurality of predefined frequencies.

In one example, the instructions 710 may include instructions to activate a video camera to capture a video of the movement of the cells in a separator region of the DEP separator and instructions to count a number of cells that enter into a respective outlet of the DEP separator.

The instructions 712 may include instructions to calculate a cross-over frequency based on data collected from the instructions to track. The instructions 714 may include instructions to set an operational frequency of an electrical field generator of the DEP separator based on the cross-over frequency to perform a subsequent separation of the cell from a mixture of different types of cells in the buffer.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
a dielectrophoresis (DEP) separator to separate particles in a flow, the separator comprising an inlet channel to receive the flow and a microfluidic channel to receive the flow from the inlet channel, the flow comprising two different types of particles, and two outlet channels branching from the microfluidic channel;
an electrical field generator coupled to the DEP separator to apply an electric field having a frequency to the DEP separator;
a tracking system to track a movement of at least some of the particles in the DEP separator; and
a controller in communication with the electrical field generator to control the frequency of the electric field and the tracking system to track the movement of the particles as a function of frequency into one of the two outlet channels, wherein the controller is to calculate a cross-over frequency from a cross-over frequency distribution for a first type of particles based on a frequency sweep and movement of the first type of particles into a first or a second of the two outlet channels;
wherein the DEP separator further comprises a focusing region to receive the flow from the microfluidic channel, the focusing region being tapered to narrow the flow into a separation region that is configured to separate, using the electric field generated across the separation region, the first type of particles into the first or the second of the two outlet channels.

2. The apparatus of claim 1, wherein the controller is to apply a plurality of different frequency steps and determine the cross-over frequency on a peak of the cross-over frequency distribution for the first type of particles.

3. The apparatus of claim 1, wherein the controller is to calculate the cross-over frequency for the two different types of particles and a plurality of different buffer solutions.

4. The apparatus of claim 1, further comprising:
a memory in communication with the controller, the memory to store the cross-over frequency for the first type of particles.

5. The apparatus of claim 4, wherein the controller sets an operational frequency in a subsequent separation of the first type of particles from a mixture of the first type of particles with other particles based on the cross-over frequency of the first type of particles that is stored in the memory.

6. The apparatus of claim 1, further comprising:
a proportioning valve coupled to the microfluidic channel to control a composition of the buffer solution.

7. The apparatus of claim 1, wherein the tracking system comprises a video based tracking system.

8. The apparatus of claim 1, wherein the tracking system comprises a coulter counter at each outlet of the DEP separator.

9. The apparatus of claim 8, wherein the controller is to detect the first type of particles based on output from sensors in the coulter counter.

10. The apparatus of claim 1, wherein the particles comprise cells of at least two different types.

11. The apparatus of claim 1, wherein the electrical field generator comprises electrodes located along the walls of a microfluidic channel running through the DEP separator.

12. The apparatus of claim 1, wherein the electrical field generator comprises three electrodes, including a ground electrode, arranged around a separation region of the DEP separator.

\* \* \* \* \*